(No Model.)  2 Sheets—Sheet 1.

J. B. WILLIAMS.
SEEDING MACHINE.

No. 375,036.  Patented Dec. 20, 1887.

Attest:  
Sidney P. Hollingsworth  
W. R. Kennedy

Inventor.  
J. B. Williams  
By his Atty.  
P. T. Dodge (No Model.) 2 Sheets—Sheet 2.
J. B. WILLIAMS.
SEEDING MACHINE.
No. 375,036. Patented Dec. 20, 1887.
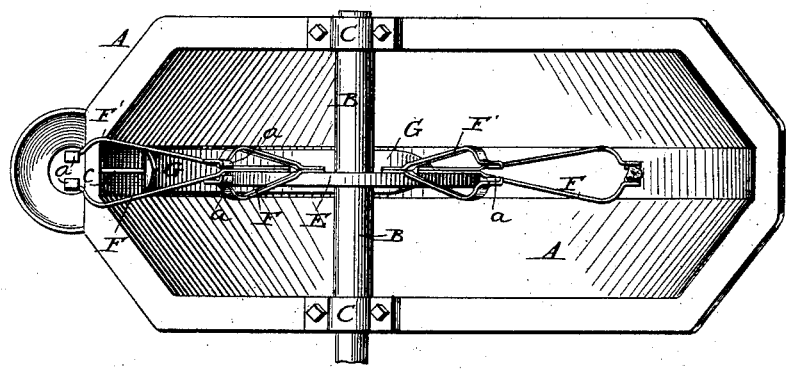
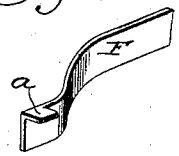
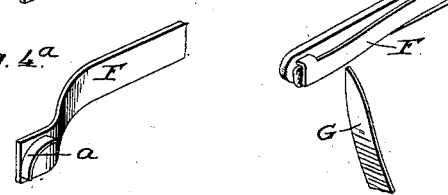
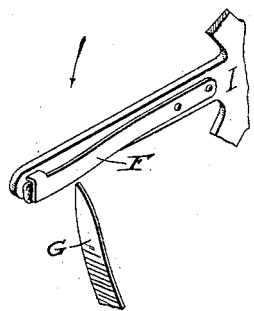
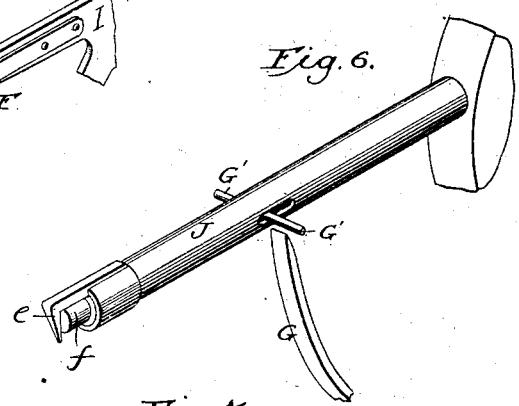
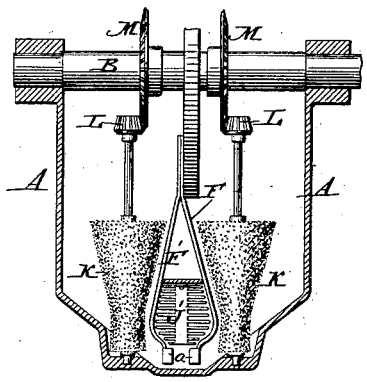
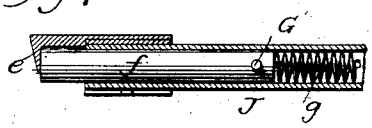
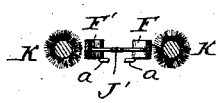
Attest:
Sidney P. Hollingsworth
W. R. Kennedy
Inventor:
J. B. Williams
By his Atty.
P. T. Dodge
N. PETERS, Photo-Lithographer, Washington, D. C.

UNITED STATES PATENT OFFICE.

JAMES B. WILLIAMS, OF GLASTONBURY, CONNECTICUT.

SEEDING-MACHINE.

SPECIFICATION forming part of Letters Patent No. 375,036, dated December 20, 1887.

Application filed April 26, 1887. Serial No. 236,194. (No model.)

*To all whom it may concern:*

Be it known that I, JAMES B. WILLIAMS, of Glastonbury, in the county of Hartford and State of Connecticut, have invented certain Improvements in Seeding-Machines, of which the following is a specification.

The aim of my invention is to provide a machine by which peas, corn, and other seeds may be delivered positively and at a uniform rate of speed; and to this end it consists, essentially, in the combination of a hopper or seed-receptacle, a series of arms or nippers moving therethrough and each adapted to grasp one or more seeds, and means for positively controlling the action of said arms, so that they open and close upon the seed within the hopper, carry the seed forward to the proper point of delivery, and there open to permit its escape.

The invention further consists in various details of construction, which will be hereinafter fully explained.

I have represented in the accompanying drawings my invention embodied in its preferred forms; but it will be manifest to the skilled mechanic after reading this specification that the details may be variously modified without changing, essentially, the mode of action or departing from the limits of the invention.

Figure 1:
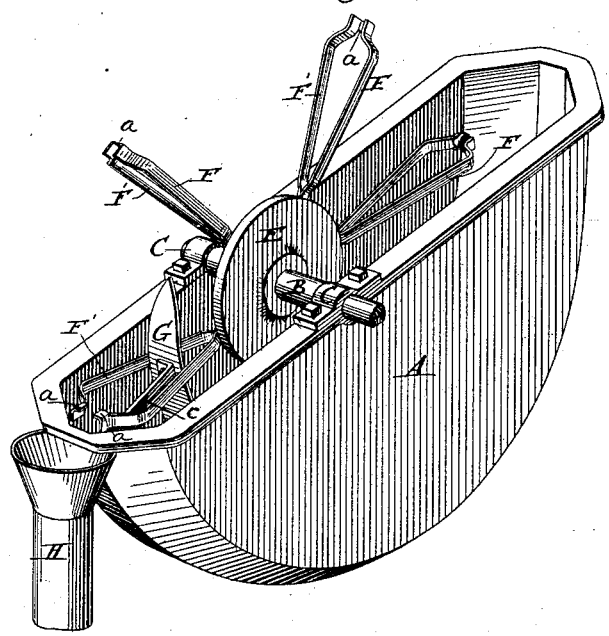
Figure 2:
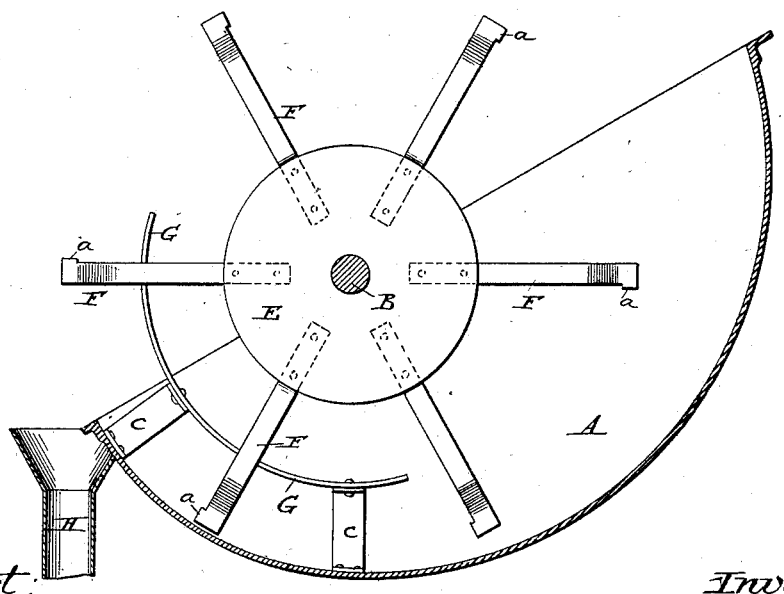

Figure 1 represents a perspective view of a dropping mechanism constructed on my plan. Fig. 2 is a side elevation of the same, the hopper being shown in vertical section. Fig. 3 is a top plan view. Fig. 4 is a perspective view of one of the dropping-arms. Fig. 4ª is a view of the same in another form. Fig. 5 is a view illustrating a modified construction. Fig. 6 is a perspective view of still another modification of the dropper-arm. Fig. 7 is a longitudinal section through the end of the same. Figs. 8 and 9 are section elevations showing my dropper combined with stripping devices such as are used in the planting of cotton-seed.

Referring to Figs. 1, 2, and 3, A represents a hopper or seed-receptacle, which may be of any suitable form and construction, but preferably made, as shown, with vertical side walls and a bottom curved from front to rear.

B represents a transverse shaft mounted in suitable bearings, C, sustained on the sides of the hopper, or otherwise, and provided at its middle with a hub, E, carrying a series of radial elastic seed-dropping arms, F F', arranged in pairs, as shown. The two arms of each pair are secured at the inner ends rigidly to the hub, curved apart laterally between their inner and outer ends, and formed and arranged at their outer ends to spring together when released in order to grasp the seed between them. Their outer ends may be made in such forms as will best adapt them to seize and retain the desired quantity of seed; but I recommend for ordinary purposes the form shown in Fig. 4, in which the flat opposing faces are provided with flat lips $a$, or of the form shown in Fig. 5, in which the lips are of hollow or concave form. By the revolution of the shaft the ends of the successive arms are caused to travel through the bottom of the hopper and the mass of seed therein from front to rear. Within the hopper is secured, by standards $c$ or otherwise, a stationary cam or rail, G, which acts between the companion arms to separate their outer ends. As the two arms of each pair approach the hopper at the front, they ride against and travel along opposite sides of the rail, by which their ends are separated and held apart while passing through the seed, so that the latter may enter freely between them. As the arms rise at the rear, and before leaving the mass of seed, they leave the rail, and, springing toward each other, grasp one or more seeds between their ends. Continuing their rotation, the arms carry this seed upward and forward until they encounter the forward end of the rail, by which they are separated more widely than in the hopper and caused to release the seed, which falls into a conducting-tube, H, or other receiver.

It will be perceived that at the time of releasing the seed the arms are in their vertical plane falling outside of the hopper, whence it is that the seed are delivered outside instead of inside the hopper.

In order to secure the best results, the bottom of the hopper should be curved from front to rear in the manner shown in the drawings, its forward portion lying close to the path of the arms, while its rear portion is curved outward eccentrically, in order that the arms may carry only the seed which is grasped between them. I also recommend that the bottom of the hopper be inclined downward from the two sides toward the middle, that the seed may all gravitate within reach of the arms.

In order to adapt the machine for planting seeds of different kinds, I may provide a series of interchangeable arms of different sizes and forms at the outer ends, and provide for attaching one series or another to the hub, as occasion may require, using for the purpose fastening-screws, such as shown, or other equivalent fastening devices.

It will be observed that each pair of arms is, in effect, but a grasping device or nipper adapted to seize and hold a charge of corn, and it is manifestly immaterial in what form these grasping devices are made, provided they are adapted to act in the manner described.

In Fig. 5 I have illustrated a modified construction, in which a hub, I, has a series of rigid arms and also elastic arms F F' attached to its side. These elastic arms, which may be in all respects identical with the arms shown in the preceding figures and operated by a stationary rail in the same manner, will grasp the seed between their inner faces and the face of the disk.

In Figs. 6 and 7 I have illustrated another modification. In this example the hub is provided with tubular arms J, each having at the outer end a projecting angular lip, $e$. Within the arm is mounted a sliding plunger, $f$, urged outward by a spiral spring, $g$, and acting in connection with the lip $e$ to grasp the seed in passing through the hopper. This plunger is provided with an ear, G', projecting laterally through a slot in the arm and arranged to encounter a stationary rail or cam, G, whereby the device is opened and closed upon the seed within the hopper, and then caused to reopen at the proper point to discharge the seed. It is to be observed that this device, which is but an equivalent of that represented in Fig. 1, will be mounted and operated in like manner.

It will be observed that in my devices represented in Figs. 1 to 4 the arms are arranged to open and close laterally—that is to say, in a direction at right angles to the plane of rotation. This arrangement is found peculiarly efficient, for the reason that the seed are certain to enter between the co-operating arms as the latter travel through the hopper.

Cotton-seed and certain other classes of seed have a fibrous coating, which causes them to cohere, so that their separation and uniform delivery is a matter of difficulty. In order to adapt the devices for the proper discharge of this seed, I combine with the discharging devices, which may be in all other respects identical with those hereinbefore described, stripping devices to remove from the carrying-arms and from the seed grasped between them all adhering seed and fiber.

In Fig. 8, J' represents an arm or stripper fixed in the middle of the hopper, and in such position that the companion arms will pass on opposite sides as they leave the mass of seed in the hopper. This stripper is provided with bristles or elastic fingers, as shown. Outside of the arms are located two additional strippers, K, which may be, as shown, in the form of rotary brushes driven by beveled pinions L from gears M, fixed on the main shaft or otherwise driven. In place of these rotary strippers I may employ stationary arms similar to that in the middle, the only requirement in this regard being that the arms or stripping devices shall be of suitable form to prevent the arms from carrying out of the hopper any seed other than that grasped between their ends.

Having thus described my invention, what I claim is—

1. In combination with the hopper, the rotary elastic arms arranged in pairs and the intermediate rail or cam, substantially as described, acting to separate the arms while within the hopper that they may grasp the seed, and also to separate them at the proper point for the delivery of the seed.

2. In a seed-dropping mechanism, the combination of a hopper or seed-receptacle and a series of seed-grasping devices revolving therein and adapted to open and close transversely of the path of rotation, in combination with means, substantially as described, for positively opening said grasping devices to discharge the seed, and also holding them open during a portion of their course through the hopper.

3. In combination with the revolving seed-grasping arms, the hopper having its bottom curved from front to rear, as described, to closely follow the path of the arms at the front, but recede therefrom at the rear.

4. In combination with the rotary seed-grasping arms, the hopper having its bottom inclined downwardly from the side toward the path of the arms, whereby the seed are presented to the latter.

5. In a seed-dropping mechanism, the rotary seed-grasping arms movable to and from each other in the direction of the axis, provided with lips on their opposing faces to retain the seed.

6. In combination with a hopper and devices adapted to grasp the seed and carry them therefrom, stripping devices, as described, to remove the adhering seed.

In testimony whereof I hereunto set my hand, this 7th day of April, 1887, in the presence of two attesting witnesses.

JAS. B. WILLIAMS.

Witnesses:
W. R. KENNEDY,
ANDREW PARKER.